_United States Patent Office_

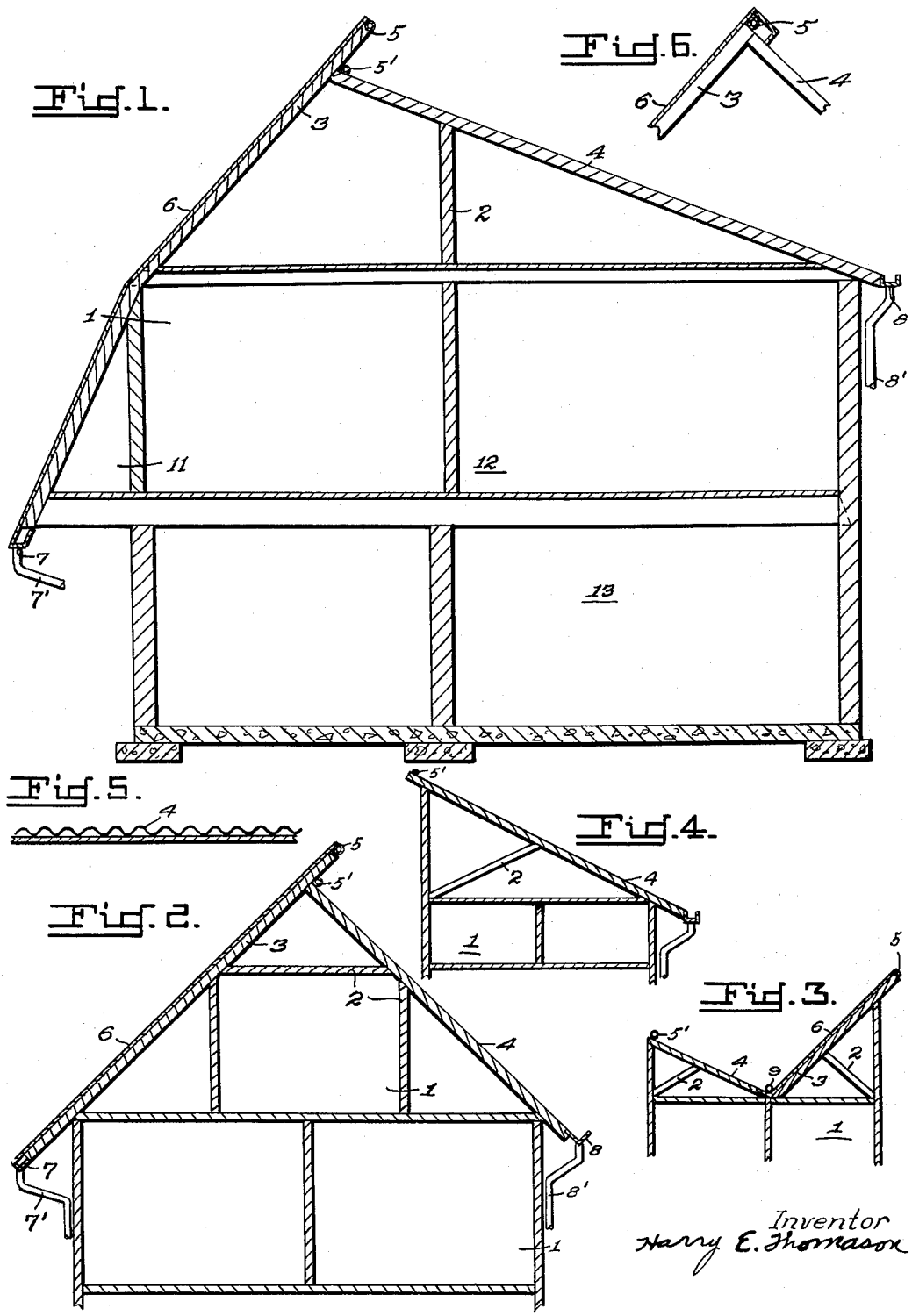

3,254,701
Patented June 7, 1966

3,254,701
COMBINATION SOLAR HEAT TRAP AND
HEAT DISSIPATOR
Harry E. Thomason, 6911 Walker Mill Road SE.,
Washington, D.C.
Filed Apr. 8, 1959, Ser. No. 804,932
7 Claims. (Cl. 165—48)

The present invention relates to a combination solar heat trap and heat dissipator.

In modern industry, homes, public buildings, private office buildings, and in numerous other places, there is a need for collecting free solar heat, and also for dissipating large quantities of heat, such as for refrigeration, air conditioning, cooling steam condenser water, and such. Obviously it is highly desirable that this heat be dissipated with the most simple and trouble-free apparatus possible, with little attention and maintenance being required. Also, it is highly desirable that the apparatus operate with the lowest amount of power possible.

It is an object of this invention to provide heat dissipating apparatus which is simple and trouble-free in operation.

It is another object to provide heat dissipating apparatus which is inexpensive to construct, yet substantially permanent and requiring practically no attention or maintenance.

It is another object to provide heat dissipating apparatus which will discharge tremendous quantities of heat to the atmosphere with an expenditure of power which is practically nil.

It is another object to provide heat dissipating apparatus which is usable in conjunction with a solar heat collector, if desired, such as the solar heat collector described and claimed in my copending patent application S.N. 731,064, filed April 25, 1958 and now Patent Number 3,145,707 granted Aug. 25, 1964. When the present invention is used with such heat collector, there are additional advantages to be described later.

The heat may be dissipated and the resulting "coolness" may be stored and used to air condition the building as claimed in my copending application S.N. 835,962, filed Aug. 25, 1959 and in my application entitled "Cooling Apparatus" filed Sept. 9, 1965, S.N. 489,019, a continuing application of the present application.

Referring now to the drawings:

FIGURE 1 illustrates a building having a roof which comprises a solar heat collector and a heat dissipator in accordance with the present invention.

FIGURE 2 illustrates a modified roof construction embodying the present invention.

FIGURE 3 illustrates another modification embodying both a solar heat collector and a heat dissipator.

FIGURE 4 illustrates a modification wherein the entire roof may be used as a heat dissipator.

FIGURE 5 illustrates one type of roofing material usable as he heat-dissipator surface.

FIGURE 6 illustrates an embodiment wherein only one distributor manifold is required.

Refrring now specifically to FIG. 1, I have illustrated a building having living space at 1 and 12, and having a somewhat A-shaped roof with internal bracing 2. Closet space is provided at 11 and basement space at 13. On the southward exposed section of the roof, a solar heat collector 3 may be provided, the north-faced roof section being illustrated at 4, this section being utilized to dissipate heat to the atmosphere when desired.

The solar heat collector 3 may be constructed in accordance with teachings embodied in said Patent Number 3,145,707, and may include a liquid distributing pipe 5 through which liquid to be heated is introduced into the heat collector. The heat collector contains insulation, a blackened heat-collecting surface, and a transparent covering 6, (preferably two sheets of transparent material spaced apart) above the heat-collecting surface. Liquid from distributing pipe 5 flows down over the heat-collecting surface, thus becoming heated, and is collected in collector trough 7. The heated liquid flows from trough 7, via conduit 7' to a point of storage or use.

The heat dissipator 4 comprises a simple heat dissipating roofing material. One example of a suitable roofing is illustrated in FIG. 5. The heat dissipator has a distributor manifold 5' similar to manifold 5 of the heat collector. This manifold has small liquid outlet holes therein, for example, one hole for each valley, if corrugated sheet metal is used. The liquid flows down the valleys in small streams and is collected in collector trough 8. The cooled liquid flows from trough 8 via conduit 8' to a point of use or storage. Other types of conventional roofing material may be used, but corrugated aluminum is particularly good.

The construction illustrated in FIG. 2 is very similar to that of FIG. 1, except for the different roof style illustrated. Living space 1 is provided on both the first floor and on the second floor. The present heat dissipator, and the solar heat collector described and claimed in said copending application, lend themselves readily to various roof designs, at low-cost, only a few of which are illustrated.

FIG. 3 illustrates a "butterfly" roof design incorporating a heat dissipator 4, bracing 2 and inlet manifold 5'. The solar heat collector 3 has an inlet manifold 5, a transparent covering 6 and insulation, a blackened heat-collecting surface, etc. In this modification, a single collector trough 9 may be provided if the heat collector and heat dissipator are not to be operated simultaneously. In most installations these devices will be operated alternately, such as summertime use for the heat dissipator and wintertime for the solar heat collector or nighttime use for the dissipator and daytime use for the heat collector. However, where concurrent operation is desired, separate collector troughs may be provided.

FIG. 4 illustrates a building wherein the entire roof is used as a heat dissipator. For many purposes, such a large expanse of heat dissipator is not needed. However, such construction may be used in an installation such as where a stationary diesel power plant is operated in a building and excess heat must be liberated from the engine. The present heat dissipator may be used as a low-cost substitute for the "radiator." Also, where a steam boiler and turbine are used, excess heat from the condenser water may be dissipated from the roof of the building to produce the cooling necessary for high-vacuum on the final stage of the turbine.

As illustrated in FIG. 6, the upward extension of the solar heat collector may be omitted and a single distributor manifold 5 may be used. It may be turned to feed liquid to the heat collector during the winter and turned to feed the liquid to the heat dissipator during the hot months.

The present invention has many advantages over other forms of heat dissipating devices, and is particularly adaptable for use with a solar heat collector so that a building may be cooled and air-conditioned in the summertime, as well as heated by solar energy in the wintertime. (Exemplary apparatus for utilizing the heat, the "cool," or both, which is obtained by this apparatus, forms the subject matter of another Patent No. 3,254,702, filed Aug. 25, 1959, and is not disclosed herein.) Another example of use for both the solar heat collector and heat dissipator is a stationary power plant wherein solar heat is used to preheat boiler water, and the heat dissipator is used to cool the condenser water for a high-vacuum on the final stage of the steam engine, or turbine.

Among the salient features of the present invention are low-cost construction and simplicity of operation. The heat dissipator requires little more than a conventional roof of low-cost permanent roofing, which can be applied to the building with a minimum of labor. Although the solar heat collector disclosed in said prior patent application is simple, the present heat dissipator is even more simple, no glass, Mylar, insulation or black surface being required. (However, in some installations, insulation, or a darkened surface, or both, may be used.) Further, when the two units are utilized in the same installation, the same circulating pump and motor may be used to circulate liquid for heating or for cooling. Also, a single heat or "cool" storage apparatus may be used.

By extending the solar heat collector above the roof apex, as illustrated in FIGS. 1 and 2, the heat dissipator is shaded and kept cooler, so as to be more effective, while the solar heat collector is of greater capacity. Thus, this combination of features yields dual desirable results. If the utmost of cooling is not required, then the cooling apparatus need not be operated in the daytime, and more heat per hour may be liberated from, say midnight to 6:00 a.m. However, due to the heat collector extension keeping the heat dissipator cooler during the daytime, the heat dissipator can be used earlier than midnight if desired, or in the daytime under many conditions.

Heat dissipation is particularly great with this apparatus for several reasons. One reason is that, due to the upward extension of the solar heat collector, the sun does not shine on the roof and hence it is kept cooler. Another reason is that the heat dissipator surface is extremely large, thus being capable of dissipating large quantities of heat by radiation to the atmosphere. In addition, to radiation, the liquid (such as water) flows in thousands of feet of small streams, and hence there is much heat dissipation due to evaporation. Further, inasmuch as the top of the heat dissipator is not as high as the top of the heat collector, it is less steep and the water flows more slowly, thus liberating more heat.

Thus, due to the above factors, where the "coolness" can be stored from night, to be used to air-condition a building the following day, the apparatus need be operated for a short time only. Inasmuch as a small circulating pump is all that is required to run the liquid through the heat dissipator, very little power is required to "get rid of the heat." There is no necessity for a cooling tower, a river of cooling water, heat dissipating wells, heat dissipating coils, fans, or such.

This cooling apparatus may be used with or without the solar heat collector described in Patent No. 3,145,707. I have disclosed apparatus in Patent No. 3,254,702 which is usable with said solar heater and the present heat dissipator to store heat, or to store "coolness." Other apparatus disclosed in said latter application can extract the heat or cool from said storage apparatus and deliver it to living quarters of a home, can filter the air in the home, and can provide standby auxiliary heating means, all with simple, inexpensive equipment.

What I claim is:

1. A combination heat dissipator and solar heat collector comprising a structure usable as a roof of a building, said structure comprising a generally south-facing solar heat collector section and a generally north-facing heat dissipator section for cooling a liquid by flowing it over the heat dissipator, said solar heat collector section being adjacent to and extending substantially higher than said heat dissipator to thereby increase the size of said solar heat collector and to provide shade for said heat dissipator, and means to introduce a liquid onto said heat dissipator section for cooling of said liquid.

2. A combination heat dissipator and solar heat collector comprising a structure usable as a roof of a building, said structure comprising a generally south-facing solar heat collector section and a generally north-facing heat dissipator section, said solar heat collector being adjacent to and extending substantially higher than said heat dissipator, thereby increasing the size of said solar heat collector while providing shade for said heat dissipator, said heat dissipator being provided with an inlet distributor manifold to supply liquid to said dissipator to be cooled and an outlet collector manifold to collect the cooled liquid.

3. A combination heat dissipator and solar heat collector comprising a structure usable as a roof of a building, said structure comprising a generally south-facing solar heat collector section provided with means to heat a liquid and a generally north-facing heat dissipator section provided to cool a liquid, said solar heat collector being adjacent to and extending substantially higher than said heat dissipator, thereby increasing the size of said solar heat collector, providing shade for said heat dissipator, and making the heat dissipator less steep, thus increasing efficiency, said heat dissipator being provided with an inlet distributor manifold to supply liquid to said dissipator to be cooled and an outlet collector manifold to collect the cooled liquid.

4. A heat dissipator comprising an irregular heat radiating surface set at an incline to the horizontal, an inlet distributor manifold at the upper edge of said radiating surface and having means to introduce a vaporizable liquid to be cooled onto the radiating surface, whereby said liquid will flow down said inclined radiating surface and will dissipate excess heat through radiation and evaporation, and means, comprising a solar heat collector having an extension to shade said radiating surface from much of the sun's rays such that said surface remains cooler and more efficient in helping dissipate heat from the liquid flowing thereover, and collector means at the lower edge of said heat radiating surface to collect the cooled liquid for return to a point of use or storage.

5. A heat dissipator comprising a heat radiating surface set at an incline to the horizontal, an inlet distributor manifold at the upper edge of said radiating surface and having a plurality of holes therein to introduce a vaporizable liquid to be cooled onto the radiating surface, whereby said liquid will flow down said inclined radiating surface and will dissipate excess heat through radiation and evaporation, and means, comprising a solar heat collector having an upward extension projecting above the upper edge of the radiating surface, to shade said radiating surface from much of the sun's rays such that said surface remains cooler and more efficient in helping dissipate heat from the liquid flowing thereover, and collector means at the lower edge of said heat radiating surface to collect the cooled liquid for return to a point of use or storage.

6. A heat dissipator comprising a corrugated heat radiating surface having hills and valleys, said surface being set at an incline to the horizontal, an inlet distributor manifold at the upper edge of said corrugated radiating surface and having means to introduce a liquid to be cooled onto the radiating surface, the valleys running down said incline and providing substantially parallel valleys whereby said liquid will flow down said valleys and will dissipate excess heat through radiation and evaporation, and a solar heat collector extending upwardly from the lower edge of said heat dissipator, said heat collector comprising a heat collecting surface and a distributor manifold to introduce water to said collector to be heated, and a common collector manifold at the lower edge of said heat dissipator and heat collector to collect cooled water from said heat dissipator, or heated water from said heat collector, and to return said cooled or heated water to a point of storage or use.

7. A heat dissipator comprising a corrugated heat radiating surface having hills and valleys, said surface being set at an incline to the horizontal with the valleys of said radiating surface running substantially parallel down the incline, an inlet distributor manifold at the upper edge of said corrugated radiating surface and having means to introduce a liquid to be cooled onto the radiating surface, whereby said liquid will flow down said inclined radiating surface and will dissipate excess heat through radiation and evaporation, and a solar heat collector having extension means to shade said radiating surface from much of the sun's rays such that said surface remains cooler and more efficient, said heat collector having an inlet distributor manifold and a collector manifold to collect the heated fluid from the solar heat collector, and a collector manifold at the lower edge of said heat radiating surface to collect the cooled liquid.

References Cited by the Examiner

UNITED STATES PATENTS

| | | | |
|---|---|---|---|
| 1,357,938 | 11/1920 | Beckett | 62—179 |
| 1,737,371 | 11/1929 | Hamm et al. | 50—12 |
| 2,424,410 | 7/1947 | Miles | 50—236 |
| 2,660,863 | 12/1953 | Gerhart | 62—259 X |
| 2,680,565 | 6/1954 | Lof | 62—2 X |

ROBERT A. O'LEARY, *Primary Examiner.*

HERMAN BERMAN, HERBERT L. MARTIN, EUGENE F. BLANCHARD, *Examiners.*

CHARLES SUKALO, R. F. BURNETT,
*Assistant Examiners.*